UNITED STATES PATENT OFFICE.

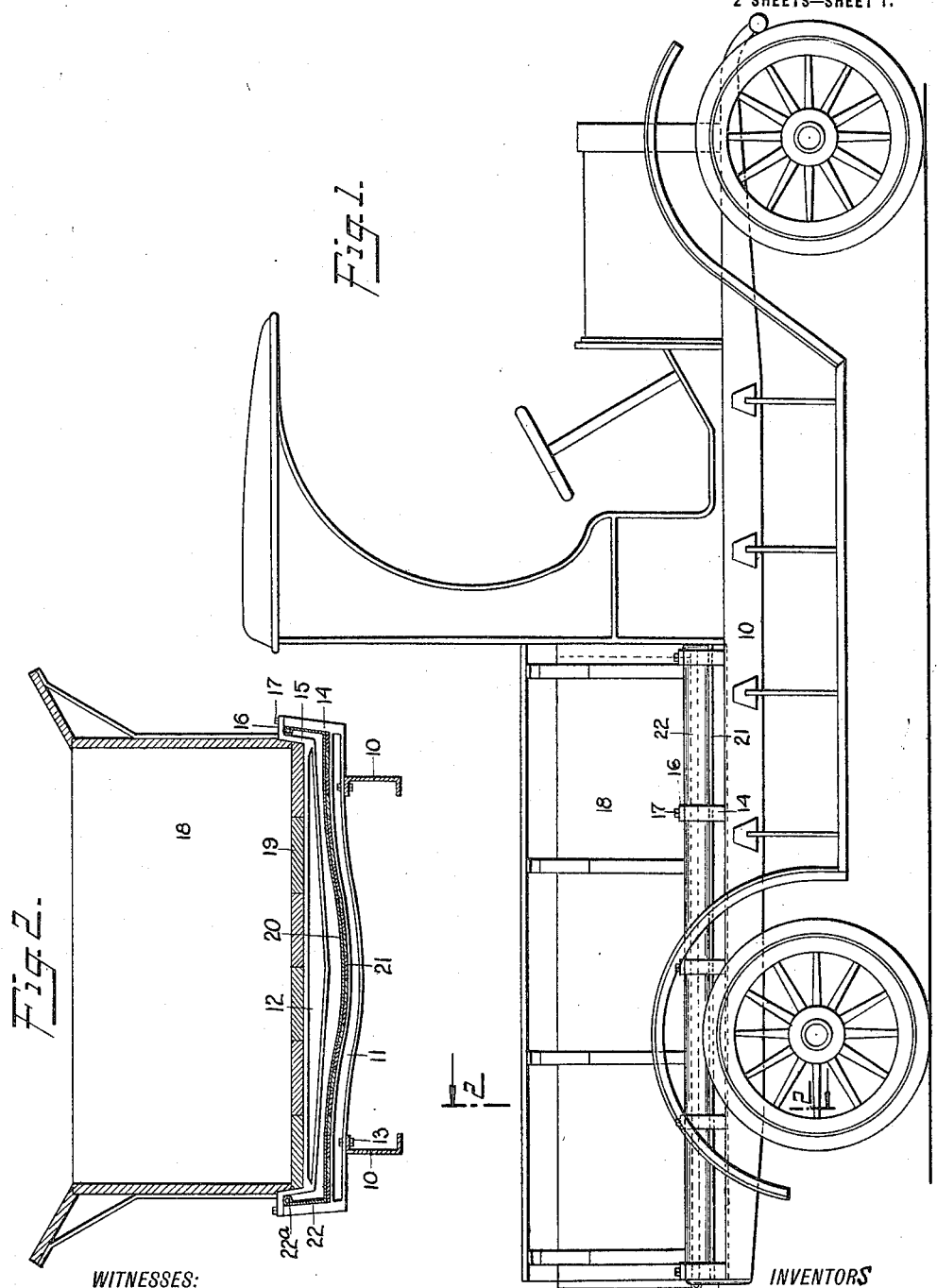

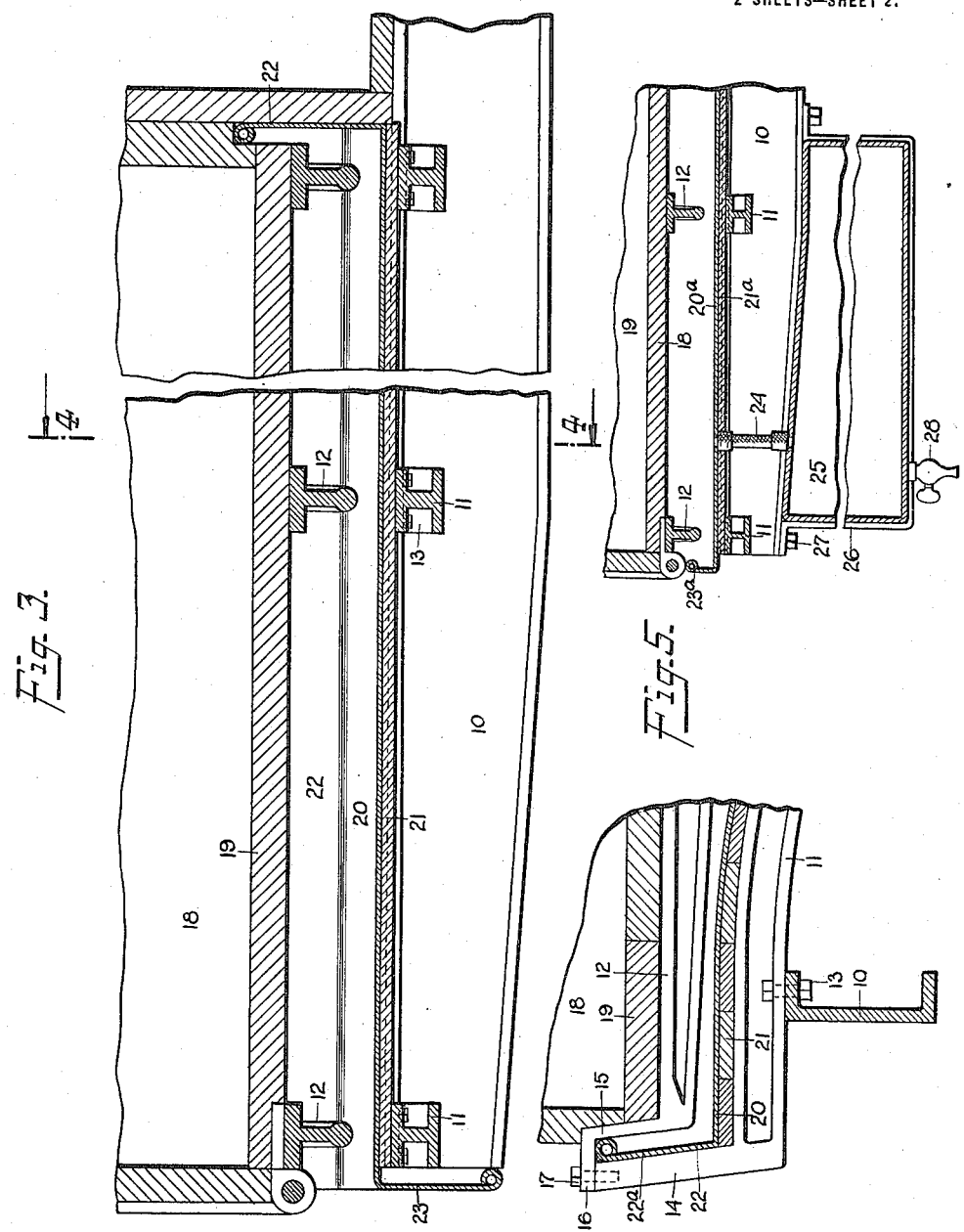

REUBEN H. BACHMAN AND FRANKLIN H. BACHMAN, OF ALLENTOWN, PENNSYLVANIA.

ANTIDRIP SUBFRAME FOR VEHICLES.

1,148,426.  Specification of Letters Patent.  Patented July 27, 1915.

Application filed January 19, 1915. Serial No. 3,079.

*To all whom it may concern:*

Be it known that we, REUBEN H. BACHMAN and FRANKLIN H. BACHMAN, both citizens of the United States, and residents of Allentown, in the county of Lehigh and State of Pennsylvania, have invented a new and Improved Antidrip Subframe for Vehicles, of which the following is a full, clear, and exact description.
Our invention relates to a vehicle having means to receive drip from the body of the vehicle, and protect the vehicle parts beneath, including, in the case of automobiles, the gearing, etc.
The objects of the invention are to provide a sub-frame and drip pan attachment so arranged as to be applied to vehicles of standard makes, without any material alteration therein, and to be interposed between the chassis or frame of the vehicle, and the body; to provide an attachment of the indicated character in which the drip pan will be supported between upper and lower cross members, the lower cross members being adapted to rest on the vehicle frame, and the upper cross members having end support only on the lower members whereby to provide a free space for the interposed drip pan and prevent the upper cross members from contacting with the pan to the damage of the latter, due to the vibration of the vehicle.

Other purposes and advantages of the invention will appear from the more specific description following.
Reference is had to the accompanying drawings forming part of this specification, in which similar characters of reference indicate corresponding parts in all the views, and in which:
Figure 1 is a side elevation of an automobile equipped with our improved sub-frame and drip pan; Fig. 2 is a transverse vertical section on the line 2—2 Fig. 1; Fig. 3 is a broken longitudinal vertical section on an enlarged scale; Fig. 4 is a transverse section on the line 4—4 Fig. 3; and Fig. 5 is a fragmentary longitudinal vertical section illustrating a modification.

As shown in the illustrated example, the members 10 of a vehicle chassis or frame are of any approved form, and receive the lower cross members 11, which preferably for their greater length, are in the form of I-bars in cross section. On the said lower cross members 11 upper cross members 12 are supported. The lower cross members 11 may be secured in any suitable manner to the frame 10, as by bolts 13. The lower cross members have upturned ends 14, and the upper cross members 12 have upwardly extending ends 15 which are offset laterally at their extremities as at 16 to overlie the upper ends of the upturned ends 14 of the cross members 11. The connection may be completed by screws or bolts 17 extending through the said terminals 16 and into the ends 14.

It will be observed that the described construction affords end support only for the upper cross members 12, so that the latter are suspended on the upturned ends 14 of the lower cross members 11 and spaced throughout their length above the said lower cross members. The intervening space accommodates a drip pan 20, which is preferably disposed above the sub-flooring 21, the latter being laid directly on the cross members 11. The spacing of the upper cross member, throughout its length, it will be seen, prevents damaging contact with said upper cross members and the drip pan in the vibration of the vehicle.

At the sides and front the drip pan 20 has an upwardly extending flange 22, the upper edge of which may be beaded as at 22ª. The said upturned flanges at the sides are received between the upwardly extending ends 14 of the lower cross members 11 and the upwardly extending ends 15 of the upper cross members 12. The upwardly extending ends 15 of the upper cross members 12 give a depressed position to the bodies of the said cross members, and on said depressed cross members the body 18, of any approved form, is received. The bottom boards 19 of said body may be laid directly on the said cross members.

The length of the respective cross members and the dimensions of the drip pan 20 are such that the flanges 22 will lie outside the bottom 19 of the body, so as to receive any drip escaping at the angles at the sides of the body. Referring particularly to Fig. 3, it will be seen that the rear end of the drip pan 20 is formed with a downwardly extending flange 23 in the rear of the longitudinal frame members 10 of the vehicle, the upwardly extending flanges being omitted at the rear. Liquid dripping from the body into the pan 20 will thus escape out of the rear end of the pan and run downward on the flange 23.

If desired, the pan may be of a form to prevent the escape of the drip at the rear end, and a tank may be provided to which the drip is conveyed from the pan. The tank construction can be employed on vehicles if it is considered undesirable that the drip be permitted to escape on to the floor of a garage, or on to a street pavement. One arrangement of the drip collecting tank is indicated in Fig. 5. In this form a pipe 24, which may consist of a short length of hose, establishes communication between the drip pan 20ª and a tank 25, the latter being secured to the underside of the chassis or frame 10 by straps 26 and bolts 27. A turn cock 28 may be provided on the tank to draw off the drip when desired. In this form of the invention the rear end of the pan is upturned as at 23ª, to retain the drip.

Having thus described our invention, what we claim as new and desire to secure by Letters Patent, is:

1. An auxiliary frame and drip pan for vehicles comprising separate upper and lower cross members, the upper members having end support from the lower members and presenting a free space between the points of end support, and a drip pan on the lower cross members below and separated from the upper cross members, said lower cross members being adapted to rest on a vehicle frame and the upper cross members being adapted to accommodate a vehicle body.

2. An auxiliary frame and drip pan for vehicles comprising upper cross members adapted to accommodate a vehicle body, and lower cross members adapted to rest on a vehicle frame, the upper cross members having separable connection at their ends with the ends of the lower cross members, and said members between the ends being spaced vertically, and a drip pan supported on the lower cross members below the upper cross members.

3. An auxiliary frame and drip pan for vehicles comprising lower cross members having upturned ends and adapted to be secured on a vehicle frame, separate upper cross members having upturned ends secured to the upper ends of the lower cross members, and adapted between its said ends to accommodate a vehicle body, and a drip pan supported on the lower cross members below the upper cross members.

4. An auxiliary frame and drip pan for vehicles comprising lower cross members having upturned ends and adapted to be secured on a vehicle frame, separate upper cross members having upturned ends secured to the upper ends of the lower cross members, and adapted between its said ends to accommodate a vehicle body, and a drip pan supported on the lower cross members below the upper cross members, said drip pan having upwardly extending edge flanges disposed between the upturned ends of the respective cross members.

5. An auxiliary frame and drip pan for vehicles comprising lower cross members having upturned ends and adapted to be secured on a vehicle frame, separate upper cross members having upturned ends secured to the upturned ends of the lower cross members and adapted between the ends thereof to accommodate a vehicle body, flooring laid on the lower cross members, and a drip pan resting on said flooring and having upturned edge flanges.

6. An auxiliary frame and drip pan for vehicles comprising lower cross members having upturned ends and adapted to be secured on a vehicle frame, separate upper cross members having upturned ends secured to the upturned ends of the lower cross members and adapted between the ends thereof to accommodate a vehicle body, flooring laid on the lower cross members, and a drip pan resting on said flooring and having upturned edge flanges at the sides and front, the bottom of the pan at the rear end having a downwardly extending flange.

In testimony whereof we have signed our names to this specification in the presence of two subscribing witnesses.

REUBEN H. BACHMAN.
FRANKLIN H. BACHMAN.

Witnesses:
R. A. SMITH,
L. K. HEALEY.

Copies of this patent may be obtained for five cents each, by addressing the "Commissioner of Patents, Washington, D. C."